United States Patent Office 2,833,723
Patented May 6, 1958

2,833,723
SILICEOUS PARTICLES HAVING SURFACE-COATING OF —OR GROUPS, DISPERSED IN VOLATILE ORGANIC LIQUIDS

Ralph K. Iler, Brandywine Hundred, Del., assignor to E. I. du Pont de Nemours and Company, Wilmington, Del., a corporation of Delaware No Drawing. Application May 27, 1955
Serial No. 511,803

3 Claims. (Cl. 252—308)

This invention relates to compositions comprising a dispersion, in a volatile organic liquid, of an organophilic solid which is preferentially wetted by butanol in a butanol-water mixture and which comprises a supercolloidal substrate coated with —OR groups, the substrate having a surface of silica and having a specific surface of from 1 to 900 square meters per gram, the coating of —OR groups being chemically bound to said silica, R being a hydrocarbon radical of from 2 to 18 carbon atoms wherein the carbon attached to oxygen is also attached to hydrogen, the weight ratio of organic liquid to organophilic solid being at least 1:1.

This application is a continuation-in-part of my copending application Serial No. 429,404, filed May 12, 1954, now abandoned.

The organophilic solid component of the present compositions is an estersil. Estersils are a new class of substances described and claimed in United States Patent 2,657,149, issued October 27, 1953, to Ralph K. Iler. The present invention is broadly applicable to the various estersils described in said patent, the preferred estersils for the present compositions being those claimed in the more restricted claims of the patent. In particular, estersils which are not only organophilic but so highly eserified as to be also hydrophobic, and which comprise an open-packed, amorphous silica substrate bearing on its surface —OR groups derived from short-chain alcohols such as ethanol, propanol, or butanol, are especially preferred.

The volatile liquid is any liquid having a boiling point no higher than 150° C. Liquids of which the boiling is no higher than that of o-xylene, that is, a boiling point up to and including 144° C., measured at atmospheric pressure, are especially preferred. Thus, for purposes of this invention o-xylene is considered to be a volatile organic liquid, as are also the various hydrocarbon solvents such as benzene, hexane, and heptane, the lower-boiling alcohols such as methanol, ethanol, and n-propyl, the volatile ketones such as acetone, the halogenated hydrocarbons such as carbon tetrachloride, amines such as diethylamine, esters such as amyl acetate, amides such as dimethylformamide, and the like.

In addition to the volatile liquid there can be present in the compositions of this invention another material, the usefulness of which is enhanced by the estersil, particularly because the dispersion of estersil in the volatile liquid provides a medium for introducing the estersil into intimate contact with the other material.

The invention will be better understood by reference to particular instances showing the utility of estersils dispersed in volatile organic liquids. It will be noted from these illustrative examples that the proportions of estersil to volatile liquid can be widely varied, and can even vary during use of the compositions, as when some or practically all of the volatile liquid is evaporated off. Ordinarily, however, the weight ratio of volatile liquid to estersil will be at least 1:1, and there must be used a major proportion of volatile liquid—a ratio of say, 5:1—if a continuous liquid phase is to be present, since the estersil can absorb subtantial amounts of liquid and still appear dry or only slightly damp.

The dispersions of the present invention are especially adapted for application to surfaces. The effect upon the surface will, of course, depend upon the particular volatile liquid and the particular estersil employed, but in general a valuable modification of the surface will be achieved. Moreover, the compositions of this invention are valuable for modifying other substances to be applied to surfaces. Thus, the compositions can be added to paints, waxes, surface cleansers, paint removers, and the like to effect valuable modification of the action of such materials upon surfaces.

Estersils can be mixed with volatile oils; for example kerosene, gasoline, and naphtha, or with organic solvents such as benzene, carbon tetrachloride, etc. Such mixtures can be applied to surfaces of metals to lubricate them during forming operations, including rolling, stamping, drawing, and die casting. The composition can be applied to the metal prior to the forming operation or applied to the surface of the forming equipment. It can be applied to the inner surface of molds into which metals are cast. In all such instances, the evaporation of the volatile component leaves the estersil as the lubricant on the treated surface.

Estersils can be added to organic solvent-type metal cleaning baths to act as dirt- and oxide-dispersing agents, keeping the dirt from redepositing upon the metal surface. In particular, the estersils can advantageously be employed in volatile organic solvents as cleaning compositions to remove deposits such as waxes and silicone oils from automobile finishes preparatory to refinishing. The solvents especially adapted for this purpose are benzene, and chlorinated hydrocarbons such as trichloroethylene. Surface-active agents, such as long-chain alcohol sulfates, are advantageously included in such compositions. The presence of the estersil seems to increase the capacity of the solvents to remove the unwanted deposits, and the refinish may be applied on top of the estersil residues.

In organic type soldering fluxes, such as the rosin fluxes, which contain volatile organic solvents such as alcohol, estersils may be incorporated to advantage. The estersils act as dispersing agents for zinc chloride-type fluxes with the rosin component. The estersils thicken rosin fluxes and thus conserve the active ingredient and improve the efficiency of the fluxing action upon the surface of the metal being soldered.

Estersils can be incorporated into film-type rust inhibitors (rust preventatives), such as the long chain amines, which are applied from volatile organic solvents or solvent-water mixtures to the esurface of metals. The estersils promote adhesion of the corrosion-inhibiting coating to the metal and harden the coating.

Fuels which are volatile organic liquids can be improved by the addition of estersils, preferably in a finely divided dispersed state. During the combustion of fuels, particularly where the latter are sprayed within a combustion chamber, the siliceous particles produced by the combustion of estersils provides a catalytic surface for combustion, particularly when a small amount of chromium or other catalytic oxide is incorporated into the estersil prior to admixture with the fuel. This is particularly desirable for fuel oils used for diesel engines. The estersils have the advantage of non-esterified siliceous materials in that they are dispersible in the organic fuel medium, and are much less likely to be flocculated and to clog jets and lines. Estersils can also be dispersed in the alcohol used in rocket fuels, for similar reasons.

Dispersions of estersils in volatile liquids can contribute improvements to insecticides, fungicides, and other pesticides. The pesticides may be suspended in the dispersions and thus applied to the material to be protected. Evaporation of the volatile liquid leaves the estersil-pesticide combination in a particularly effective form. For instance, mothproofing agents can be combined with estersils, which may be used as inert diluents or carriers for mothproofing agents. The estersil particles, being used for these purposes should be very fine and thus specially adapted to spreading evenly in a thin invisible film, bearing the mothproofing agent, on the textile fiber surface. Mildew-proofing agents can be incorporated with estersils in much the same manner. The fungicidal coatings on citrus fruits can be modified by the addition of estersils which promote wetting of slightly hydrophobic fruit surfaces.

Dispersions of estersils, in volatile liquids, can be used advantageously in various ways for treating papers. Other materials can be incorporated into the dispersions to produce a variety of results, the estersil serving to enhance the effectiveness of the auxiliary material. Thus, greaseproofing, bloodproofing and waterproofing coatings on paper can be improved by incorporating them from volatile liquid dispersions—especially aqueous dispersions of estersils which provide improved adhesion to paper fibers. Coatings of this type and impregnating solutions of the type used for wet-strengthening paper, when utilized in conjunction with the liquid dispersions of estersils, also give improved dimensional stability. Special types of paper coatings can be improved by incorporating estersils into the coating compositions. For example, light sensitive coatings such as used on blueprint paper and photographic paper, can be improved by the incorporation of estersils which give smoother coatings which can be spread in thinner layers on paper and provide additional surface area, for the adsorption of light sensitive materials. For example, estersils can be applied with a binder as a sub-coat, and then the estersil-coated paper can be coated with a solution or dispersion of light sensitive agents, including silver bromide, and the ferrocyanide compositions of blueprint paper or the diazonium salts used in diazotype papers in which a wetting agent has been added to help spread the coating on the paper.

Thermal insulation of low density and high thermal resistance can be made from estersils bonded with small amounts of inorganic or organic adhesives, the adhesives and estersils being mixed as dispersions in a volatile organic liquid. Such insulation is particularly advantageous in refrigerators.

Estersils can be used as a clarifying agent and adsorbent for the purification of volatile petroleum and other liquid products. The estersils, for example, can be mixed with decolorizing clays, such as attapulgite, the estersils promoting dispersing of the attapulgite in the liquid and improving the decolorizing efficiency.

While the dispersing liquids in compositions of this invention are organic liquids it will be seen that in some uses these organic dispersions can be added to aqueous media. For instance, when an estersil dispersed in acetone is added to an aqueous suspension of paper pulp in a beater, the acetone is miscible with the water and leaves the estersil thoroughly dispersed in the aqueous pulp suspension.

It is to be understood that, in describing the various compositions which are improved by the incorporation of estersils, no attempt has been made to mention all of the various additives found in such compositions. Antioxidants, softeners, pigments, accelerators, and a whole host of additives are known in the various arts. Where a particular art is discussed herein and the principal ingredients of the compositions are mentioned, the additives known to the art can also be included in amounts and combinations heretofore known.

A problem in the modification of organic polymers, waxes, surface coatings and other organic systems has been to obtain an effective dispersion of estersil throughout the organic material. Frequently, it is not practical to use such devices as roll mills, colloid mills or homogenizers for dispersion, and the only possibility is to predisperse the estersil in a volatile organic liquid and then incorporate the dispersion with the remaining components.

Such dispersions are readily prepared according to this invention by any of several procedures. If a powdered form of the estersil is used, it is often possible to get good incorporation simply by stirring thoroughly. Generally, however, it is desirable to mill the mixture using such equipment as an ink mill, Gaulin homogenizer, Charlotte mill, or other comparable equipment.

Normally the amount of estersil which can be conveniently incorporated into a volatile liquid is about 10 to 15 percent. This will vary considerably, however, with the polarity of the liquid, the presence of other materials such as water, and the extent of milling. It takes only about 5 to 10 percent estersil to gel non-aromatic or low aromaticity types such as carbon tetrachloride, chloroform, trichlorethylene, kerosene, odorless mineral spirits, and alkanes. Other non-polar liquids of the aromatic or medium-aromaticity classifications, such as toluene, benzene, xylene, turpentine, unsaturated hydrocarbons, VM & P naphtha and low-boiling mineral spirits, will require in the range of 10 to 15 percent silica products for effective gelling action.

Polar compounds, compounds containing a high ratio of oxygenated or other solvating groups relative to their molecular weights, require on the order of 15 to 20 percent estersil to be effectively gelled.

Besides their utility of often simplifying the manner in which the estersil may be incorporated into various systems, many of these volatile liquid dispersions have other utility also, as will be evident in many of the examples which follow.

A combination of liquids such as isobutyl alcohol and ethylene glycol is economical and would be of interest as a hydraulic fluid, except that its consistency is too fluid. The incorporation of 5 to 10 percent estersil in the mixture bodies up the liquids sufficiently to give them utility as a hydraulic fluid having the desired viscosity characteristics and stability over an appreciable temperature range.

From the foregoing discussion it will be seen that estersils, in the proportions indicated, have general utility as bodying agents for volatile organic liquids. The bodying may represent only a slight increase in viscosity or it may range all the way to gel formation. Both extremes are useful in particular applications, as already pointed out and as will become apparent from the following illustrative examples:

*Example 1*

A mixture of 20 parts of estersil powder, of the type produced according to Example 5 of Iler Patent 2,657,149, and 180 parts of methyl isobutyl ketone is rolled in a quart porcelain ball mill with 250 parts of 6 mm. diameter glass beads for one hour. Fifteen parts of the estersil dispersion is stirred into 48½ parts of a clear brushing lacquer, LavaLac (Felton, Sibley and Co., Philadelphia, Pa.). The product is a uniform, substantially homogeneous mixture suitable for flatted lacquer applications.

*Example 2*

Twenty parts of an estersil dispersion in methyl isobutyl ketone, prepared as described in Example 1, is stirred into 20 parts of a spar varnish. The resulting mixture, which is a stable, uniform dispersion, is brushed onto a standard black gloss plate and allowed to dry. Measurement of the gloss with a Gardner portable 60° glossmeter gives a meter reading of 44, versus a value of 98 for a similarly applied film of unmodified varnish.

*Example 3*

Thirty parts of an estersil dispersion in methyl isobutyl ketone, prepared as described in Example 1, is stirred into 70 parts of an outside white paint comprising a titanium oxide pigment in a bodied linseed oil vehicle (Du Pont "40"). The resulting mixture, which is a stable, uniform dispersion, is brushed onto a standard black gloss plate and allowed to dry. Measurement of the gloss with a Gardner portable 60° glossmeter gives a meter reading of 39, versus a value of 64 for a similarly applied film of unmodified paint.

*Example 4*

Thirty parts of an estersil dispersion in methyl isobutyl ketone, prepared as described in Example 1, is stirred into 70 parts of a white paint comprising a titanium oxide pigment in an alkyd resin vehicle (Du Pont "Duco"). The resulting mixture which is a stable, uniform dispersion, is brushed onto a standard black gloss plate and allowed to dry. Measurement of the glass with a Gardner portable 60° glossmeter gives a meter reading of 20, versus a value of 84 for a similarly applied film of unmodified paint.

*Example 5*

A mixture of 15 parts estersil of the type described in Example 1, 15 parts dimethylformamide, and 70 parts toluene are passed through a Manton-Gaulin homogenizer at 5000 pounds' pressure drop. The resulting gelled mixture is then brushed onto a baked enamel-coated sheet of steel and allowed to remain for 5 minutes. The enamel coating is then easily scraped off, exposing the bare metal.

When the solvent-cleaning composition is used without the estersil component, the brush coating technique is unsatisfactory because the solvent drains too rapidly from the surface to be cleaned.

*Example 6*

The composition described in Example 5 is brushed over grease-coated parts of a domestic baking oven and allowed to stand for half an hour. Moderate scraping and washing of the parts with water is then sufficient to remove all trace of grease. In this instance it is not feasible to clean the parts by immersion in the cleaning solvent because of their bulky nature and the large volume of solvent which is required.

*Example 7*

In a porcelain ball mill, 5 parts of pelleted estersil is rolled with 250 parts of 6 mm. glass beads for one hour. Then 60 parts methylene chloride, 28 parts carbon tetrachloride, 2 parts ethanol and 5 parts "Paraplex" G–50 (Rohm & Haas) are added and rolling is continued for 16 hours. The resulting clear gel is applied to an enameled steel with a brush and allowed to remain for five minutes. The enamel is then easily removed by gentle scraping.

In the absence of the estersil component, it is necessary to immerse the enameled component in a bath consisting of the above solvents in order to remove the enamel.

*Example 8*

A dispersion is prepared consisting of 2 parts estersil, 1 part "Tween" 81 (polyethylene sorbitol monooleate, Atlas Powder Co.), 24 parts naphtha and 73 parts mixed xylenes.

This composition is rubbed over the surface of a car which had been polished a month previously with a silicone polish. The removal of the polish is complete, enabling the surface to be re-painted without further treatment. The presence of the estersil in the solvent aids in the removal of the silicone and the composition is more effective than if the estersil is absent.

A similar composition, from which estersil is absent, does not remove all the silicone in one application and in some areas three treatments are required to give a suitable surface for painting.

*Example 9*

A mixture of 10 parts estersil, 78 parts isobutyl alcohol and 12 parts glycol is placed in a ball mill with 500 parts of porcelain stones. The estersil is effectively dispersed after 16 hours rolling to yield a clear, moderately viscous liquid.

The fluid composition is charged to the hydraulic braking system of an automobile and is very effective and durable when tested under a wide variety of climatic and road conditions. In the absence of estersil, a mixture of isobutyl alcohol and ethylene glycol in the above proportions is unsuited to this use because the composition is not sufficiently viscous.

*Example 10*

A mixture of 15 parts of estersil and 85 parts of methyl ethyl ketone is passed through a laboratory Manton-Gaulin homogenizer at 5000 pounds pressure drop for three passes in order to thoroughly disperse the estersil.

Then a mixture of 5 parts of this master mix, 11 parts of DOP plasticizer, 18 parts Vinylite QYNV (Bakelite Co.), 1 part "Dyphos" and 1 part DS–207 (National Lead Co. stabilizers) are blended thoroughly using an ink mill. Finally, 64 parts acetone is blended into the heavy mixture in a pony mixer to give a homogeneous dispersion of moderate viscosity.

A framework of wire suitably constructed for use as a dish-holder is dipped into a large container containing the estersil dispersion and is then removed. Shortly after the removal of the wire structure, dripping ceases, and the holder is hung up in an air-circulating oven maintained at 350° F. After 15 minutes the framework is removed from the oven for inspection. The structure is uniformly and heavily coated. The use of this formulation obviates the necessity of preheating the framework before dipping to prevent sagging and dripping, and enables heavier coating of the wires.

*Example 11*

A mixture of 4 parts estersil and 43 parts acetone is thoroughly stirred to give a slurry. This is added to an aqueous slurry of 53 parts unbleached spruce kraft pulp, having a water content of about 75 percent, preparatory to forming paper sheets. After the sheets are formed and dried, they are found to contain 6.4 percent estersil. These sheets show considerably improved ink receptivity when printed, as compared with conventional sheets prepared without the addition of estersil to the pulp. Due to its introduction in admixture with the volatile organic solvent, acetone, the estersil is uniformly distributed throughout the paper.

*Example 12*

Five parts of estersil is dispersed in 30 parts methyl ethyl ketone using a Manton-Gaulin homogenizer. To this dispersion is added with good agitation a solution consisting of 30 parts of a stearyl half-ester of a styrene maleic anhydride copolymer in 135 parts methyl ethyl ketone. This composition is brushed onto a spade and a steel garden barrow and dries to a hard, adherent non-tacky film which protects these articles from rusting during winter storage. A similar composition not containing estersil gives a film with an unpleasant waxy feel.

*Example 13*

An engine running on fuel containing 1 part estersil per 100 parts of diesel oil gives improved performance indicating approximately a 5 percent increase in efficiency based on fuel consumption. After 1000 hours of operation, the engine is dismantled and is found to be much cleaner than after the same test period using unmodified diesel oil, thus indicating more efficient combustion of the fuel.

I claim:

1. A composition consisting essentially of a dispersion, in a volatile organic liquid having a boiling point no higher than 150° C., of an organophilic solid which is preferentially wetted by butanol in a butanol-water mixture and which comprises a supercolloidal substrate coated with —OR groups, the substrate having a surface of silica and having a specific surface of from 1 to 900 square meters per gram, the coating of —OR groups being chemically bound to said silica, R being a hydrocarbon radical of from 2 to 18 carbon atoms wherein the carbon attached to oxygen is also attached to hydrogen, the weight ratio of organic liquid to organophilic solid being at least 1:1.

2. A composition consisting essentially of a dispersion, in a volatile, organic liquid having a boiling point no higher than 150° C., of from ½ to 15 percent by weight of an organophilic solid which is preferentially wetted by butanol in a butanol-water mixture and which comprises a supercolloidal substrate coated with —OR groups, the substrate having a surface of silica and having a specific surface of from 1 to 900 square meters per gram, the coating of —OR groups being chemically bound to said silica, R being a hydrocarbon radical of from 2 to 18 carbon atoms wherein the carbon attached to oxygen is also attached to hydrogen.

3. A composition consisting essentially of a dispersion, in a volatile organic liquid having a boiling point no higher than 144° C., of from ½ to 15 percent by weight of an organophilic solid which is preferentially wetted by butanol in a butanol-water mixture and which comprises a supercolloidal substrate or amorphous silica coated with alkoxy groups, the substrate being in the form of aggregates of coherent, non-porous, spherical, ultimate units of average diameter in the range of 5 to 15 millimicrons, the aggregates having an average pore diameter of at least 4 millimicrons and a specific surface area of about from 200 to 600 square meters per gram, and there being in the alkoxy group coating, chemically bound to said silica, at least 270 alkoxy groups per 100 square millimicrons of substrate surface area, and the alkyl radical of the alkoxy groups being a hydrocarbon radical of from 3 to 6 carbon atoms wherein the carbon attached to oxygen is also attached to hydrogen.

References Cited in the file of this patent
UNITED STATES PATENTS
2,657,149    Iler ------------------ Oct. 27, 1953